Aug. 5, 1969 R. C. BEAVER ET AL 3,460,028
PIPELINE INSPECTION APPARATUS WITH MEANS FOR CORRELATING THE
RECORDED DEFECT SIGNALS WITH THE ANGULAR POSITION WITHIN
THE PIPELINE AT WHICH THEY WERE GENERATED
Filed Nov. 3, 1967 3 Sheets-Sheet 1
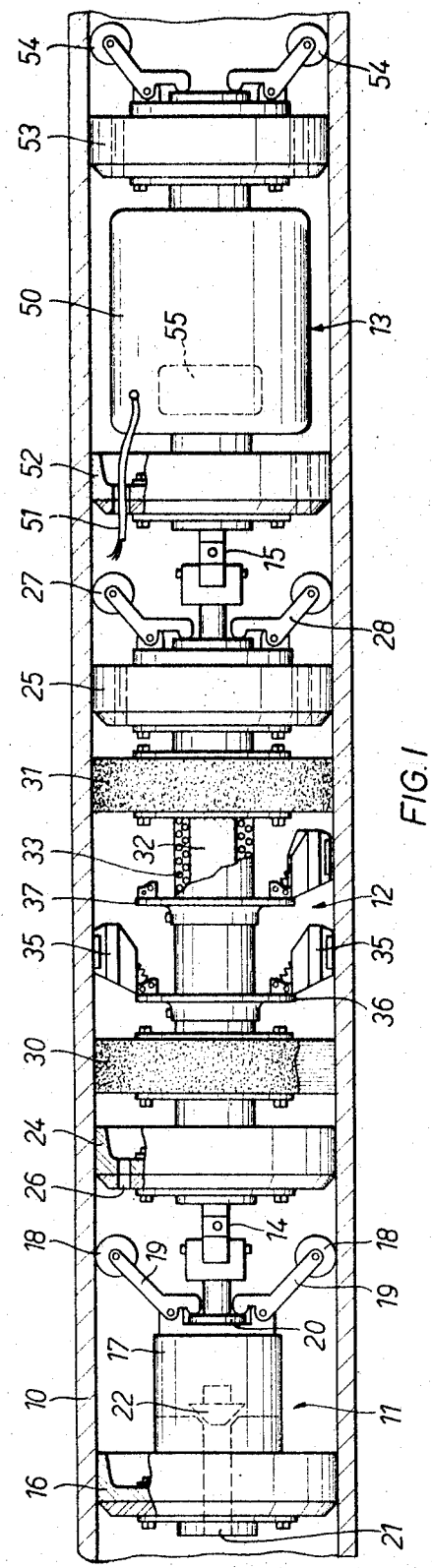
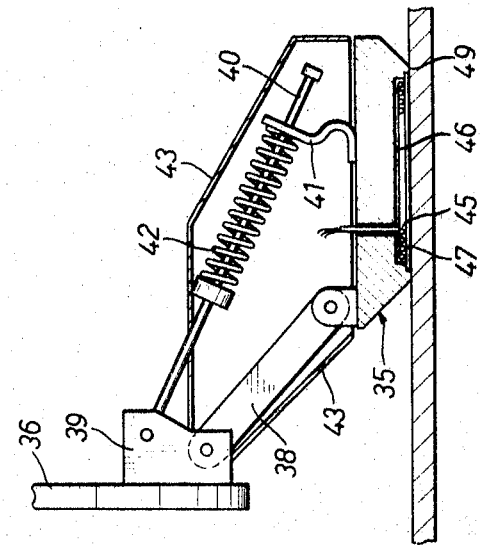
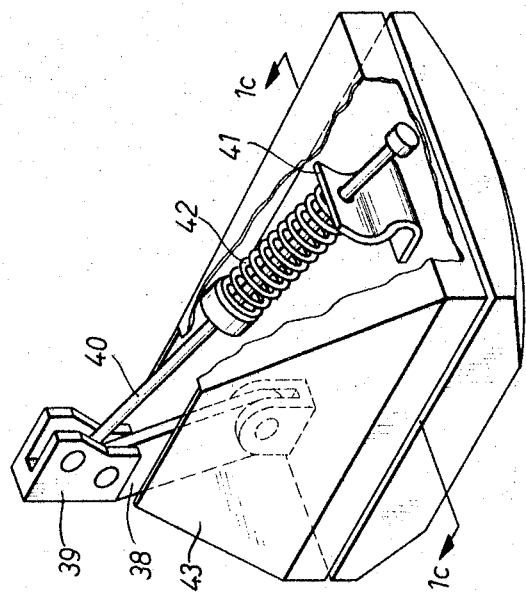
R.C. BEAVER & F.M. WOOD
INVENTORS
BY Arnold, Roylance,
Kruger & Durkee
ATTORNEYS

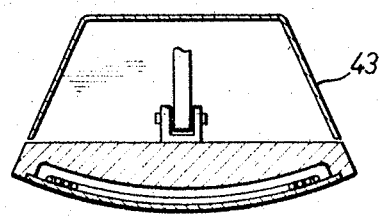
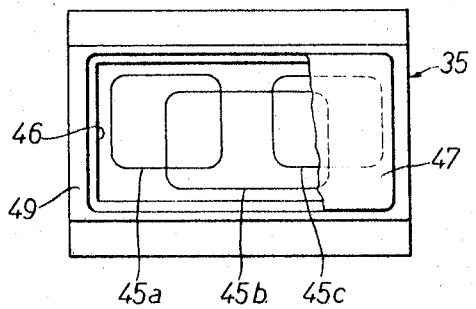
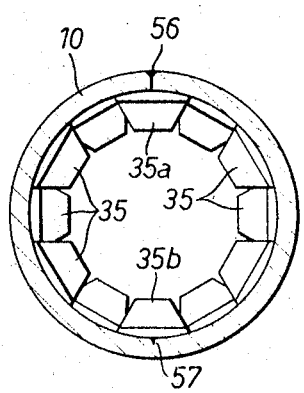
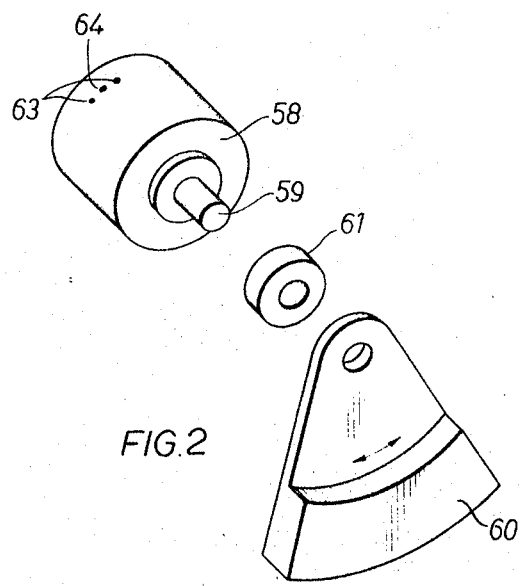
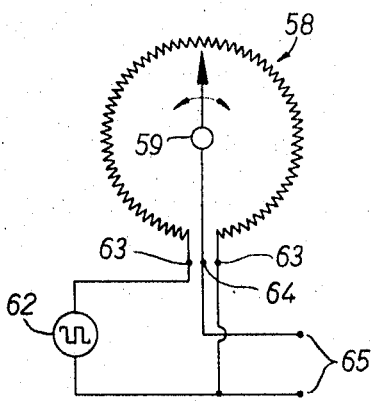
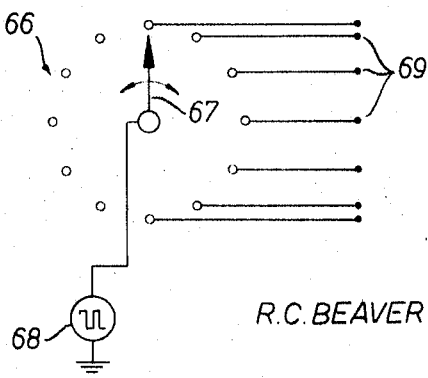

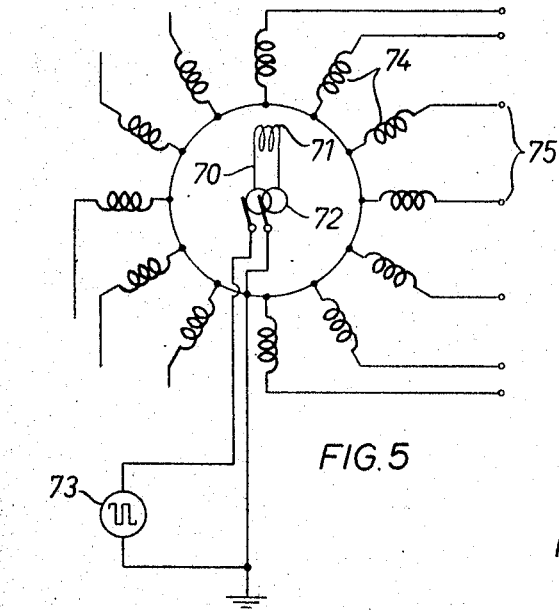
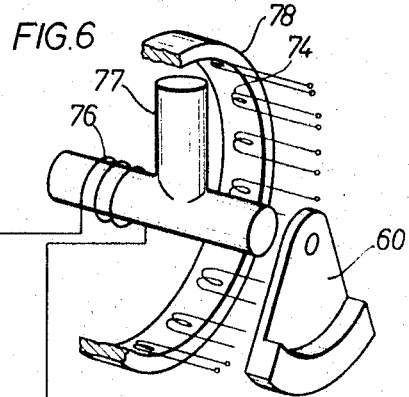
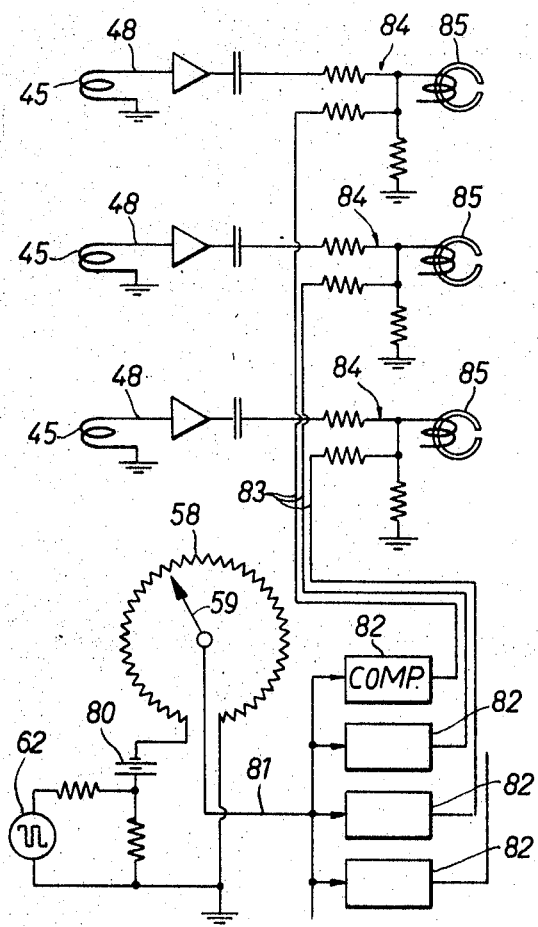
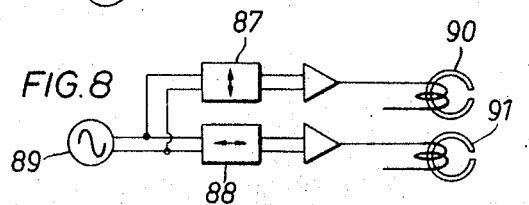
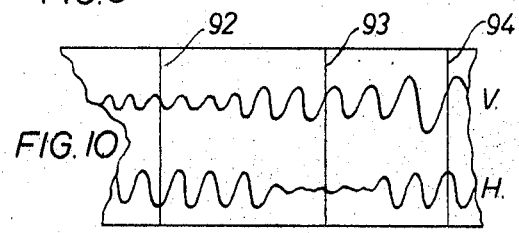
R.C. BEAVER & F.M. WOOD
INVENTORS
BY Arnold, Roylance
Kruger & Durkee
ATTORNEYS

United States Patent Office 3,460,028
Patented Aug. 5, 1969

3,460,028
PIPELINE INSPECTION APPARATUS WITH MEANS FOR CORRELATING THE RECORDED DEFECT SIGNALS WITH THE ANGULAR POSITION WITHIN THE PIPELINE AT WHICH THEY WERE GENERATED
Ruby C. Beaver, Houston, and Fenton M. Wood, Sugarland, Tex., assignors to American Machine & Foundry Company, New York, N.Y., a corporation of New Jersey
Filed Nov. 3, 1967, Ser. No. 680,574
Int. Cl. G01r 33/12
U.S. Cl. 324—37             15 Claims

ABSTRACT OF THE DISCLOSURE

This application discloses apparatus for detecting and recording the angular orientation or o'clock position of pipeline inspection apparatus of the type propelled through pipelines by the fluid product being transported, preferably inspection apparatus of the type scanning the entire interior circumference of the pipeline. The orientation detector produces electrical signals which are recorded in separate channels or added to certain ones of the channels of recorded flaw detection information to identify the top or bottom of the pipeline. Eccentric weights, accelerometers, or the like are used to detect orientation, with rotary switches, potentiometers or inductive pickups being used to produce signals for recording.

---

Oil and gas products are transported from one locality to another in metal pipelines under high pressure, the pipelines often passing through heavily populated areas. Even though usually buried below ground, the pipelines may be a hazard to person and property if not maintained in perfect condition. Leaks may occur at flaws resulting from imperfections in manufacture or installation of a pipeline, or due to corrosion or damage to the pipeline long after it is installed. The leaking product may be explosive, may kill vegetation in the area, and in any event represents a loss because it is itself valuable. Since flaws often are in the form of longitudinal cracks normal to the greatest stress, entire sections of the pipeline may fail catastrophically, resulting in loss of vast quantities of the product in a very short time and immensely increasing the explosive hazard. In an attempt to avoid failures of the pipeline, it is common practice to survey pipelines periodically for the purpose of detecting leaks, flaws, cracks, and the like, this inspection ordinarily being accomplished by self-contained "pigs" which scan the interior of the pipeline walls and record the results as they are propelled through the pipeline by the fluid product being transported.

One of the preferred types of flaw detectors for pipeline inspection pigs employs magnetic flux leakage detectors which ride along near the interior surface of the pipeline wall. Usually the detector coils are used which are mounted between pole pieces of a magnetic core producing flux in the pipeline wall, the flux being deflected out of the wall only in the vicinity of flaws, pits, and the like. The more advanced of such inspection apparatus utilizes detectors spaced around the entire circumference of the pipe so that the entire pipe wall is scanned. Since the pigging apparatus is cylindrical in shape, and preferably includes no large weights or elaborate control apparatus to hold it in a given angle or position, the pig is free to rotate about its longitudinal axis as it travels along the pipeline and encounters random obstructions. For this reason, ambiguities may exist in the record produced by the pig since the angular orientation or o'clock position of the pig is unknown. Particularly, it is difficult to distinguish between weld seams and longitudinal cracks or pits of the type referred to as "keyway corrosion," as will be described.

Large diameter pipeline is usually seam welded along its length by techniques such as electric resistance welding, submerged arc welding and flash welding. Some of these techniques, particularly submersion arc weld, produce a rather rough bead along the interior surface of the pipeline at the seam. When one of the detector shoes in the inspection pig passes longitudinally over the weld seam for the full length of the tube, it will be lifted off of the pipe surface by the weld bead, chattering and generating noise signals due to the roughness of the bead. Thus, one channel of the recorded information will be particularly noisy, exhibiting large deflections which may be mistaken for flaws. This condition alone would not be particularly troublesome were it not for the presence of a longitudinal corrosive pit along the bottom of the pipeline in many natural gas lines.

Natural gas flowing from geologic formations often carries entrained salt water vapor or other corrosive materials. In some gas pipelines, this vapor condenses into a trickle of corrosive water along the very bottom of the inside of the pipeline, this very narrow line of water flowing along the inside of the line creating a thin line of corrosion or corrosion pits which is referred to as "keyway corrosion." A very deep notch may be formed along sections of sometimes several miles length in extreme cases. The notch caused by keyway corrosion is perpendicular to the principal stress in the tube and is therefore a serious weakness in the line as it can result in a catastrophic burst of entire sections in the line with no forewarning. The normal log or recorded indication for keyway corrosion is that one channel, corresponding to the detector shoe riding over the longitudinal notch, will be generating large signals indicative of the keyway pitting. This indication is easily recognized, identified, and may be readily evaluated in seamless pipe since only one of the many channels being recorded will carry the keyway pit signals. However, in pipeline with welded seams, particularly for submersion arc weld pipe, there will always be one or occasionally two channels which will correspond to the detector shoes riding over the rough weld bead and thus generating large noise signals.

It is difficult to distinguish noise produced by the weld bead from the keyway pitting signals which are ordinarily on another channel. It is customary in laying pipeline to place the weld seam at or near the top of the line, whereas keyway corrosion will always occur in the bottom of the line, and so the weld seam noise and the keyway pitting signals will usually be at about 12 o'clock and 6 o'clock positions, respectively. Accordingly, a quite useful factor in interpreting a pipeline log is the orientation or o'clock position of each channel with respect to a top or bottom of the line.

It will also be noted that the detector shoe in the inspection pig which passes longitudinally over the weld seam will not be able to detect pits as small in size as detected by the remainder of the shoes because the shoe riding the seam will be displaced slightly away from the interior surface of the pipeline wall and will also contain more noise. In evaluating the record for this channel, deflections of small amplitude will thus be more meaningful or represent larger flaws than deflections on similar magnitude for the other channels.

It is therefore a principal feature of this invention to provide pipeline inspection apparatus, particularly of the type adapted to scan substantially the entire circumference of the interior of the pipeline, wherein the angular or o'clock position of the inspection pig is detected and recorded along with flaw detection information. In this manner the orientation of flaws, pits, keyway corrosion, etc., with respect to weld seams and the like may be indicated. Another feature is the provision of apparatus for producing electrical signals suitable for recording in response to the vertical angle of a housing such as used for pipeline inspection pigs, the apparatus being sensitive over the entire 360° of rotation without ambiguities.

In accordance with this invention, an orientation detector is provided in pipeline inspection apparatus for the purpose of producing electrical signals which may be recorded along with flaw detection signals produced by detector shoes scanning the circumference of the pipeline interior. The orientation detector may utilize an eccentric weight, accelerometer, or linear differential transformer, or the like as an orientation responsive mechanism, and the electrical signal is produced by a rotary potentiometer or switch, or a rotary inductive coupling device. The signals produced may be separately recorded or may be superimposed on selected ones of the flaw detector channels to identify such channels as being in the 12 o'clock or other selected position.

The novel features believed characteristic of the invetntion are set forth in the appended claims. The invention itself, however, as well as further objects and advantages thereof, may best be understood by reference to the following detailed description of particular embodiments, when read in conjunction with the accompanying drawings, which form part of this specification, wherein:

FIGURE 1 is an elevation view, partly in section and partly broken away, of a length of pipeline containing pipeline pigging apparatus which may advantageously incorporate the orientation recorder apparatus of this invention;

FIGURE 1a is an enlarged detailed pictorial view of one of the detector shoe assemblies and mounting therefor utilizing the apparatus of FIGURE 1;

FIGURE 1b is an enlarged detailed elevation view of the detector shoe assembly of FIGURE 1a, taken along the line 1b—1b in FIGURE 1a;

FIGURE 1c is an elevation view in section of the apparatus of FIGURE 1a, taken along the line 1c—1c in FIGURE 1a;

FIGURE 1d is a bottom view of the detector shoe of FIGURES 1a–1c, partly broken away;

FIGURE 1e is a cross-sectional view in schematic form of the detector array of the pigging apparatus of FIGURE 1 in place in a pipeline having a weld seam and a keyway pit;

FIGURE 2 is an expanded pictorial view of a potentiometer used as an orientation detector in the apparatus of FIGURE 1;

FIGURE 3 is an electrical diagram in schematic form of the apparatus of FIGURE 2;

FIGURE 4 is an electrical diagram in schematic form of another embodiment of the orientation detector arrangement of FIGURE 2;

FIGURE 5 is an electrical diagram in schematic form of still another embodiment of the orientation detector of FIGURE 2;

FIGURE 6 is a pictorial schematic illustration of a further embodiment of an orientation detector similar to that of FIGURES 2 and 5;

FIGURE 7 is an electrical diagram in schematic form of another embodiment of the orientation detector circuitry which may be utilized in the invention;

FIGURE 8 is an electrical diagram in block form of an embodiment of the invention utilizing accelerometers for orientation detection;

FIGURE 9 is a table of voltage outputs for the two accelerometers in FIGURE 8 for various orientations of the pigging apparatus; and FIGURE 10 is a view of a segment of a strip chart recording made from the magnetic recording produced by the apparatus of FIGURE 8.

With reference now to FIGURE 1, pigging apparatus is illustrated within a pipeline 10 which is of the type employed for transporting natural gas or liquid petroleum products. The pipeline 10 may be formed about eight inches up to 24" or 36" in diameter, and so the pigging apparatus shown therein will be sized accordingly. The pigging assembly includes a drive section 11, a detector section 12, and a power and instrumentation package 13, these being coupled to one another by universal joints 14 and 15. This assembly is adapted to be inserted into a pipeline at a trap of the type usually present at pumping stations, and to travel downstream in the pipeline under propulsion of the product being transported. The assembly is constructed to negotiate any turns or bends as well as obstructions ordinarily encountered in the pipeline. The obstructions may be in the form of icicles present at every weld, changes in pipeline diameter, valve seats, debris, dents in the pipeline wall, etc. Accordingly, the assembly must include the universal joints so that it may twist about a radius as tight as the shortest turning radius in the pipeline, and must be yieldable in diameter to accommodate the largest obstructions encountered. In addition, however, the assembly will be bounced and twisted in a random fashion as it travels along the line, and is generally cylindrical in shape, there is no clearly defined "top" and "bottom" to the apparatus. Rather than employ heavy weights or ballasts to maintain the assembly in a given vertical orientation, or to employ an elaborate control mechanism to maintain such orientation, it is instead preferable to permit the assembly to rotate freely about its axis if there is a tendency for it to do so as it encounters random obstructions.

The driving section 11 for the pigging assembly of FIGURE 1 includes a rubber packer 16 which functions to trap fluid on the right-hand side and thus propel the assembly from right to left due to the pressure differential which will exist across the packer. The driving section 11 includes a generally cylindrical central housing 17 which has a centering mechanism at the rear thereof which comprises a plurality of wheels 18 on pivoted arms 19, these being spring biased outward by a cylindrical drum 20. In order to control the velocity of movement of the pigging assembly through the pipeline, a through port 21 may be provided in the central housing 17, with a valve 22 functioning to close off the by-pass port 21 except when excessive velocity occurs. The valve 22 can be operated from line pressure in response to the r.p.m. of one of the wheels 18 as described in copending application Ser. No. 680,552, filed herewith and assigned to the assignee of the present invention.

The detector section 12 in the illustrative pigging apparatus includes front and rear packers 24 and 25, these being of the type having through ports 26 to permit the fluid product to pass through. The packers 24 and 25 function merely to hold the detector section 12 generally centered in the pipeline rather than to propel the assembly. A centering arrangement including wheels 27 mounted on pivoted arms 28 along with a spring biased drum as before may be utilized with the detector section 12.

The detector arrangement is of the type effective to inspect the entire 360° circumference of the pipeline wall, and may preferably utilize the magnetic flux leakage detector array as set forth in detail in copending application Ser. No. 680,551, filed herewith and assigned to the assignee of the present invention. This detector utilizes a pair of cylindrical steel brushes 30 and 31 functioning as pole pieces for an axial magnetic core 32 which is magnetized by a winding 33. Direct current in the winding 33 provided from a bank of batteries in the power pack 13 will produce magnetic flux in the core 32 which will pass radially outward through the wire brush-type pole piece 30 and through the pipeline wall 10 back through the steel brush 31 to the core 32. Magnetic flux parallel to the axis of the pipeline 10 will thus be provided in the pipeline wall, the flux being evenly distributed around the circumference of the wall. Most of the magnetic flux will pass through the steel pipewall, but in the vicinity of flaws, pits, holes, or any undesirable disruptions in the pipewall, flux will be displaced out of the wall and may be detected adjacent the interior surface of the wall. For this purpose, a plurality of detector shoes 35 are positioned between the brushes 30 and 31 in an array which functions to scan the entire circumference. Each of the detector shoes 35 scans about 30°, and so there are twelve such shoes. Six of the shoes are mounted on one disk-shaped mounting plate 36, while six more are mounted on a second mounting plate 37. The shoes 35 on the plate 37 are of course displaced by 30° with respect to those on the plate 36.

The enlarged detailed views of FIGURES 1a–1c show a preferred form of the detector shoes 35 and mounting assemblies, although it is understood that various types of flux leakage detectors or other inspection devices may be used with the assembly of FIGURE 1. Each detector shoe 35 is connected by a pivoted arm 38 to a mounting bracket 39 on the mounting plate 36. A rod 40, also pivotally connected to the bracket 39 at its upper end, is slidably connected to a bracket 41 on the top of the shoe 35, and a compressed spring 42 around the rod 40 urges the shoe 35 radially outward. A fairing or shroud 43 mounted on the shoe 35 or on the mounting bracket 39 surrounds the moving parts of the mounting arrangement to protect them from damage as may be caused by collision with debris or obstructions in the pipeline. A flux leakage detector coil 45 is positioned in a recess 46 in the bottom of the detector shoe 35, the coil being mounted on a thin flat shim 47 which functions to protect the coil but yet allow it to be positioned very closely adjacent the surface of the pipeline interior wall. A cable 48 connects the coil 45 with the amplifier and recorder circuitry in the instrumentation package. The coil 45 may be a wide flat coil of several turns, or a plurality of coils 45 may be positioned in the recess 46 in each of the detector shoes 35 as may be seen in the bottom view of FIGURE 1d. Here three coils 45a, 45b, and 45c are shown disposed in the recess 46 in an overlapping fashion. These would be separately connected by the cable 48 to the recorder circuitry, thus providing a more definite resolution of the angular position being inspected. Of course, other flux leakage detectors may be used, such as the core structure and Hall elements of copending application Ser. No. 680,404, filed herewith and assigned to the assignee of this invention. The spring and pivot mounting arrangement for the detector shoes assures that the bearing surface 49 for the shoes will be urged firmly against the pipewall as the pigging assembly encounters changes in pipe diameter, flats, valve seats, well seams, bends, etc.

The power supply and instrumentation package 13, the trailing section of the baiting assembly illustrated in FIGURE 1, carries an elongated, hermetically sealed cylinder 50 which contains all of the batteries and electronic circuitry, along with the tape recorder for the pigging assembly. An electrical cable 51 is connected from the cylinder 50 through the various packers to the other sections of the assembly. The cable would include separate conductors for each of the detector coils 45 in the twelve detector shoes 35 along with supply conductors for the magnetizing coil 33. Plug-in type connectors would be used to bridge the couplings 14 and 15 with the cable 51. Rubber packers 52 and 53, vented so that the fluid product might pass through, are positioned at the front and rear of the cylinder 50 and the section 13, and a centering mechanism including wheels 54 mounted on pivoted and spring biased arms may be utilized.

According to the invention, there is located within the pigging apparatus of FIGURE 1, ordinarily within the sealed cylinder 50 of the power and instrumentation section 13, an orientation detector 55 which functions to detect the angular position of the assembly and to produce an electrical signal suitable for recording with the flaw detection signals. The orientation detector 55 may be of various types as described below. It may be noted that in the pigging apparatus of FIGURE 1, the universal joint 15 connecting the detector section 12 with the instrumentation section 13 is of a type which permits the two sections to bend with respect to one another but not to rotate axially with respect to one another. Thus, it is permissible for the orientation detector to be in the instrumentation package; however, if a ball joint arrangement was used as the coupling 15, then the orientation detector 55 should be located in the detector section 12 since it is the orientation of the detector section which is of interest.

With reference to FIGURE 2, one embodiment of a device for producing an orientation signal is illustrated. This device consists of a potentiometer 58 of the type having a rotary tap constructed for 360° free rotation turned by a shaft 59. Preferably, the potentiometer is of the low torque variety wherein the shaft may be rotated quite freely. The potentiometer 58 is mounted in a fixed position relative to the pigging assembly, i.e., in a fixed position relative to the cylindrical casing 50. The shaft 59 is secured to an eccentric weight 60, a ball bearing unit 61 being used if desired. The weight 60 is, of course, free to rotate about its axis and thus turn the shaft 59, the weight always tending to seek the lowermost position. Thus, if the pig rotates about its axis as it travels down the line, then the slider arm on the potentiometer rotates since the potentiometer casing 58 rotates with the pig while the eccentric weight 60 will remain in a downward position.

A circuit for generating a voltage which indicates the orientation or o'clock position of the pig is illustrated in FIGURE 3. The output of a multivibrator 62 is applied to the end terminal 63 of the resistance element while the centertap or slider arm terminal 64 provides the output. Output terminal 65 thus exhibits a square wave having a magnitude controlled by the o'clock position of the pig and this square wave may be recorded on magnetic tape along with the flaw detection signals from the coils 45.

In FIGURE 4, there is illustrated an embodiment of the orientation detector wherein a twelve position low torque rotary switch 66 is utilized in place of the potentiometer 58. The rotary switch would have the same appearance and construction as the unit of FIGURE 2 but would contain twelve output terminals. The rotary tap 67, controlled by the eccentric weight 60, has a square wave from a multivibrator 68 applied thereto so that one of twelve output lines 69 will be energized with the square wave depending on the o'clock position of the pig. Rather than record the voltages on the lines 69 separately, requiring twelve channels, the outputs 69 may be superimposed on or added to the outputs from the separate coils 45, there being twelve of the detector shoes 35 containing flux leakage coils. Thus, the channel corresponding to the bottom shoe would include a low amplitude, long period square wave recorded therewith for identification on the visual record. Due to the long period and low amplitude compared to the flaw signals there would be little likelihood of confusion with flaw information.

In place of the mechanical rotary switch 66 of FIGURE 4, an inductive device may be used as shown in FIGURE 5. A rotor 70 for this device contains a coil 71 to which is applied an AC signal by slip rings 72. The rotor 70 turns with the eccentric weight 60. A square wave source 73 is connected to the slip ring. Twelve secondary or output coils 74 are provided, each one being connected separately to one of the output terminals 75.

These outputs 75 are superimposed upon the flaw detector coil outputs and recorded therewith so that an orientation signal as in FIGURE 4 will be recorded with the channel for the lowermost or uppermost detector shoe. The advantage of the embodiment of FIGURE 5 is the very small torque required to turn the rotor 70 as compared to the torque required for the mechanical switch of FIGURE 4 or the potentiometer of FIGURE 3. The torque required to turn the rotor may be further reduced by utilizing a nonrotating exciter coil 76 as seen in FIGURE 6 in place of the slip rings. The coil 76 surrounds an iron core 77 which rotates freely about a central axis under control of the eccentric weight, a suitable bearing arrangement being provided. The secondary coils 74 are arranged in a circular fashion about the path of travel of the core 77, an annular band 78 of iron encircling this path to provide a magnetic flux path. The AC field in the rotating shaft 77 is directed through the pole tip into one of the stator coils 74 arranged around the periphery of the device. The iron band 78 behind the coils 74 helps complete the magnetic circuit through the stator coils. As before, each of the coils 74 is connected through an adding circuit to one of the flaw channels with the result that one channel receives a "marker" signal from the multivibrator, this signal having a long period to avoid confusion with the flaw signals.

In FIGURE 7, there is illustrated circuitry for utilizing a rotary potentiometer 58 as in FIGURE 3 but adding the orientation signal to the flaw detection signals rather than recording it separately. In this circuit, the square wave output of the potentiometer 52 is added to a DC level provided by a battery 80 before being applied across the potentiometer 58. The output from the moving tap 59 is applied by a line 81 to a plurality of comparator circuits 82, each of which is set to produce an output for a different threshold voltage. In the illustrative embodiment, there would be twelve such comparators 82. The comparators are connected by lines 83 to separate adder circuits 84 in the recording arrangement for the flaw detector channels. Each channel includes a separate one of the flux leakage detector coils 45 which are connected by the cables 48 to the instrumentation package which contains appropriate amplifiers along with magnetic recording heads 85, usually twelve such recording heads. In operation, one, or at most two, of the comparators 82 depending upon the position of the movable arm 59, will be periodically switching from one state to another at the frequency of the multivibrator. Thus a low amplitude, long period, square wave marker signal is applied to one of the adders 84 from one of the comparators 82 and is therefore injected onto the proper flaw channel recording.

With reference now to FIGURE 8, it is noted that a pair of accelerometers 87 and 88 may be used to detect the angular position of the pigging apparatus. Each of the accelerometers is a transformer having a magnetic slug which is spring loaded to a center position. The output of the accelerometer is an AC signal varying in magnitude depending on the force on the slug or core in the transformer, the device being responsive only to force along the axis of the slug. The force may be acceleration, thus the name accelerometer, and in this case, the acceleration of gravity is the force being detected. The accelerometers 87 and 88 have their axes perpendicular to one another, both having axes perpendicular to the axis of the pipeline or pigging assembly. The accelerometer 87 is designated as a vertical axis accelerometer while the device 88 is designated as a horizontal axis accelerometer. An AC input of constant magnitude is applied from a source 89 to the inputs of the devices 87 and 88, and the outputs are applied through amplifiers to recording heads 90 and 91. Each of the accelerometers 87 and 88 produces a maximum AC output when it is oriented vertically and up, and produces zero AC output when it is oriented vertically and down, i.e., at the 6 o'clock position. At intermediate positions, the output will be in the range between zero and maximum AC voltage. For example, at 3 o'clock or 9 o'clock, the AC output will be one-half of maximum. The magnetically recorded vertical and horizontal accelerometers outputs will therefore provide a coded representation of the o'clock position of the pigging apparatus. If the magnetic record is transposed to a visual strip chart as is customary, the arcuate position would be deciphered by measuring the magnitudes of the two channels recorded by the heads 90 and 91. Alternatively, the two signals recorded by the heads 90 and 91 could could be suitably processed and a single channel recorded on the strip chart indicative of the o'clock position. If the maximum AC voltage produced by the accelerometers 87 and 88 is assumed to be two volts, and twelve shoes are used, the magnitudes of voltages recorded by the V and H channels for each of twelve possible positions of the pigging apparatus is tabulated in the table of FIGURE 9. With one of the twelve detector shoes 35 arbitrarily designated as the Number 1 shoe, it is seen that for each o'clock position of the Number 1 shoe, a different combination of voltages will be produced by the V and H outputs 90 and 91. FIGURE 10 is an illustration of the appearance of the strip chart recording of the channels produced by the recording heads 90 and 91 for three different orientations of the pigging apparatus. At a vertical line 92, the Number 12 shoe is at the bottom of the pipe so that the horizontal accelerometer 88 is producing one volt output while the vertical axis accelerometer 87 is producing zero output. At a line 93, the Number 3 shoe is at the bottom of the pipe, the horizontal accelerometer produces zero output and the vertical accelerometer produces one volt output. Under the condition indicated by the line 94 in FIGURE 10, the Number 6 shoe is at the bottom of the pipe and the horizontal accelerometer is producing one volt output while the vertical accelerometer is producing two volts output.

The mechanisms and circuitry which have been described with reference to FIGURES 2–10 for use as the orientation detector device 55 of FIGURE 1 are, of course, understood to be merely illustrative, many other devices being suitable. In any event, the objective is to produce a recorded indication of the angular or o'clock position of the pigging apparatus as it travels along the pipeline. From this indication, the detector shoe which is traveling along the weld seam, ordinarily the top or 12 o'clock position, may be identified and distinguished from the shoe which is traveling along the keyway pit which is at the bottom or 6 o'clock position.

Thus, while the invention has been described with reference to particular embodiments, it is, of course, understood that this description is not to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

What is claimed is:

1. Pipeline inspection apparatus of the type including an assembly adapted to be propelled through the pipeline, the assembly comprising
    a plurality of detector means adapted to inspect adjacent circumferential segments of a section of pipeline for providing electrical defect signals corresponding to defects detected in the wall of the pipeline,
    a plurality of defect signal channels each respectively connected to one of said detector means,
    signal recording means coupled to said signal channels for recording defect signals in said plurality of channels, means in said inspection apparatus for producing an angle signal that indicates the angular orientation of said apparatus about the central axis of the section of pipeline being inspected, and means for coupling said angle signal to the one of said signal channels which is connected to the detector means located proximate a certain angular position about said axis, whereby said angle signal also is recorded along with defect signals in said one signal channel to indicate the angular position of said apparatus about said axis.

2. The combination claimed in claim 1 wherein, said means for coupling the angle signal to a defect signal channel comprises a plurality of angle signal channels each coupled to a respective defect signal channel, each angle signal channel being adapted to conduct angle signals corresponding to respective angular orientations of said apparatus about said axis, said angle signal producing means selectively energizing an angle signal channel when a respective angular portion of said apparatus is proximate said certain angular position about said axis.

3. The combination claimed in claim 2 wherein the defect signal channel to which the energized angle signal channel is coupled is in turn connected to a detector means located proximate said certain angular position.

4. The combination claimed in claim 3 wherein said means for producing an angle signal includes an eccentric weight fixed to a rotatable shaft of rotary electrical means which produces said signal, said shaft being parallel to the axis of the section of pipeline being inspected.

5. The combination claimed in claim 4 wherein said rotary electrical means includes a potentiometer having a rotary tap that is mechanically connected to said shaft, said shaft with the eccentric weight connected thereto and said electrical means rotating with respect to each other as said apparatus changes its angular orientation about the axes of said pipeline.

6. The combination claimed in claim 5 wherein said potentiometer is energized by an alternating signal.

7. Pipeline inspection apparatus according to claim 5 wherein, the angle signal produced by said rotary tap on the potentiometer are selectively applied to one of said angle signal channels in response to the magnitude of said angle signal as determined by respective threshold detectors coupled to said angle signal channels.

8. Pipeline inspection apparatus according to claim 4 wherein, the rotary electrical means includes a rotary switch having a plurality of contacts each of which is connected to a respective angle signal channel.

9. The combination claimed in claim 4 wherein said rotary electrical means includes rotary inductive means connected to said shaft, and a plurality of inductive pick-ups positioned around the path of movement of said rotary inductive means and at respective angular portions of said apparatus, each inductive pick-up means being coupled to a respective one of said angle signal channels.

10. Pipeline inspection apparatus according to claim 9 wherein an alternating signal is applied to said rotary inductive means by slip rings.

11. Pipeline inspection apparatus according to claim 9 wherein the rotary inductive means includes a ferromagnetic core and wherein a reference alternating signal is coupled to said core by a stationary coil surrounding the rotating core.

12. Pipeline inspection apparatus of the type adapted to be propelled through the pipeline and including means for determining the angular orientation of said apparatus about the axis of the section of pipeline being inspected, the apparatus comprising a plurality of detector means for inspecting respective adjacent circumferential segments of a section of pipeline and adapted to provide respective electrical defect signals corresponding to defects detected in the wall of the pipeline, a plurality of defect signal channels each connected to a respective one of said detector means, signal recording means coupled to said defect signal channels for separately recording the defect signals from respective detector means, means for producing angle signals indicating that an angular portion of said apparatus is at a certain angular orientation relative to a fixed reference position about said axis, and means for coupling said angle signals to the defect signal channel which is connected to the detector means located at the circumferential segment of the pipeline which corresponds to said certain angular orientation, whereby angle signals are recorded in the recording means along with the defect signals detected from the segment of the pipeline corresponding to said certain angular orientation.

13. The combination claimed in claim 12 wherein said means for coupling the angle signals to the defect signal channels comprises, a plurality of angle signal channels corresponding in number to the number of said signal channels and each adapted to conduct only the angle signals that indicate that a respective angular portion of said apparatus is at said certain angular orientation, means for coupling the angle signal channels to the respective defect signal channels that receive signals from detector means located at circumferential segments corresponding to the respective angular portions of said apparatus, and means for coupling the angle signals to the angle signal channel that corresponds to the angular portion of the apparatus that is at said certain angular orientation.

14. Pipeline inspection apparatus according to claim 12 wherein the means for producing angular signals includes at least one accelerometer having a movable element responsive to gravity along a given axis, the accelerometer producing an electrical signal indicative of the orientation of such axis relative to true vertical.

15. Pipeline inspection apparatus according to claim 14 wherein two accelerometers are provided which contain movable elements responsive to gravity along orthogonal axes, each accelerometer producing a separate electrical signal indicative of orientation of respective axes with respect to true vertical.

References Cited

UNITED STATES PATENTS

| | | | |
|---|---|---|---|
| 840,148 | 1/1907 | Marriott | 33—205 |
| 2,300,999 | 11/1942 | Williams | 324—37 |
| 2,564,018 | 8/1951 | Malmqvist et al. | 33—205 |
| 2,921,380 | 1/1960 | Savet | 73—505 |
| 3,064,127 | 11/1962 | Green et al. | 324—37 |
| 3,284,701 | 11/1966 | Kerbow | 324—37 |
| 3,295,219 | 1/1967 | Stockton et al. | 33—215.3 |
| 2,998,566 | 8/1961 | Cochran | 324—37 |
| 3,238,448 | 3/1966 | Wood et al. | 324—37 |
| 3,238,448 | 3/1966 | Wood et al. | 324—37 |

RUDOLPH V. ROLINEC, Primary Examiner

R. J. CORCORAN, Assistant Examiner

U.S. Cl. X.R.

33—205, 215; 73—505; 200—61; 340—282